United States Patent
Owen

(10) Patent No.: US 6,780,021 B1
(45) Date of Patent: Aug. 24, 2004

(54) CABLE RETRACTING DEVICE

(76) Inventor: Ivar V. Owen, 400 S. Franklin St., Holland, TX (US) 76534

(*) Notice: Subject to any disclaimer, the term of this patent is extended or adjusted under 35 U.S.C. 154(b) by 0 days.

(21) Appl. No.: 10/422,738

(22) Filed: Apr. 25, 2003

(51) Int. Cl.[7] .............................................. H01R 33/00
(52) U.S. Cl. ...................................................... 439/35
(58) Field of Search .......................... 439/35, 371, 131, 439/501, 503, 504, 528

(56) References Cited

U.S. PATENT DOCUMENTS

| | | |
|---|---|---|
| 2,391,141 A | 12/1945 | Dour et al. |
| 3,815,078 A | 6/1974 | Fedrick |
| 3,920,308 A | 11/1975 | Murray |
| 4,006,952 A | 2/1977 | Puckett |
| 4,138,177 A | 2/1979 | Van Valer |
| 4,653,833 A | 3/1987 | Czubernat et al. |
| 4,842,524 A | 6/1989 | Hopkins et al. |
| 4,846,697 A | 7/1989 | Rodgers |
| 4,904,205 A | 2/1990 | Rice |
| 4,940,427 A | 7/1990 | Pearson |
| 5,129,828 A | 7/1992 | Bass |
| 5,669,471 A | 9/1997 | Unze |
| 5,723,815 A | 3/1998 | Pena |
| 6,109,957 A | 8/2000 | Fladung |

Primary Examiner—Javaid H. Nasri
(74) Attorney, Agent, or Firm—Stephn R. Greiner

(57) ABSTRACT

A cable retracting device including a housing with an interior space bounded in part by a side wall. A spindle projects into the interior space from the side wall and rotatably supports a spindle. A number of electrically conductive rings are affixed to the side wall and are concentrically arranged around the spindle. A number of electrical leads are connected to the rings and extend outwardly from the housing. A number of electrical contacts protrude from one side of the spool. Each of the contacts slidably engages a respective one of the rings. Another number of electrical leads is wound about the spool, each of which is also connected at one end thereof to a respective one of the electrical contacts. The leads wound on the spool have another end extending from the housing that can be selectively pulled from the spool. A coiled spring connected to the spool rewinds the leads on the spool in the event that they become unwound.

2 Claims, 1 Drawing Sheet

CABLE RETRACTING DEVICE

FIELD OF THE INVENTION

The present invention relates generally to electrical connectors associated with vehicle structures and, more particularly, to such connectors having a connection to a towed vehicle.

BACKGROUND OF THE INVENTION

People who routinely tow trailers with trucks know how difficult it is to protect the electrical wiring connecting the two vehicles. Often, if not attended to frequently, wiring will hang down and drag on the roadway. Sometimes, animals will chew through wiring. Prolonged exposure to sunlight will cause electrical insulation to crack, exposing wiring to the weather. All can lead to electrical circuit breaks and hazardous driving conditions with some or all of the running and signaling lights of a trailer being deenergized.

Some have proposed reels to keep wiring stowed in a safe and secure manner on land vehicles. Generally, the known reels have been complex and costly in their construction. For this reason, they have not seen either widespread consumer acceptance or commercial success.

SUMMARY OF THE INVENTION

In light of the problems associated with the known reels of storing electrical wiring on a land vehicle, it is a principal object of the invention to provide a cable retracting device of uncomplicated construction and minimal cost that that conveniently stores excess wiring extending between a towing vehicle and a trailer. The device is virtually impervious to animals, such as squirrels that like to chew on wiring, and to the weather that can degrade wiring over time.

It is another object of the invention to provide a cable retracting device of the type described that can be universally mounted on towed vehicles or trailers of different sizes. Mounting and using the device can be accomplished with a minimum of instruction and tools.

It is a further object of the invention to provide a cable retracting device that freely extends and retracts wiring to compensate for changing roadway conditions like turns and hills. Thus, while using the device, there is never any slack in an electrical cable connecting a towing vehicle to a trailer.

It is an additional object of the invention to provide a cable retracting device that carries excess electrical cable so that the device can couple towing vehicles and trailers of virtually any type. So, by way of example only, the device can be used in conjunction with: recreational vehicles, tractor trailers, boat trailers, livestock trailers, and cargo trailers.

It is an object of the invention to provide improved elements and arrangements thereof in a cable retracting device for the purposes described which is lightweight in construction and dependable in use.

Briefly, the cable retracting device in accordance with this invention achieves the intended objects by featuring a housing with an interior space bounded by at least one side wall. A spindle projects into the interior space from the side wall and rotatably supports a spool. A number of electrically conductive rings are affixed to the side wall and are concentrically arranged around the spindle. An electrical lead is connected to each of the rings and extends from the housing. A number of electrical contacts protrude from one side of the spool and slidably engage the conductive rings. Another number of electrical leads is wound about the spool, each of which is also connected at one end thereof to a respective one of the contacts. The spool-carried leads have another end extending from the housing that can be selectively pulled from the spool. A coiled spring, connected to the spool, rewinds the leads on the spool in the event that they are unwound.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistenty throughout the accompanying drawings.

DETAILED DESCRIPTION OF THE PREFERRED EMBODIMENT

Figure 1:
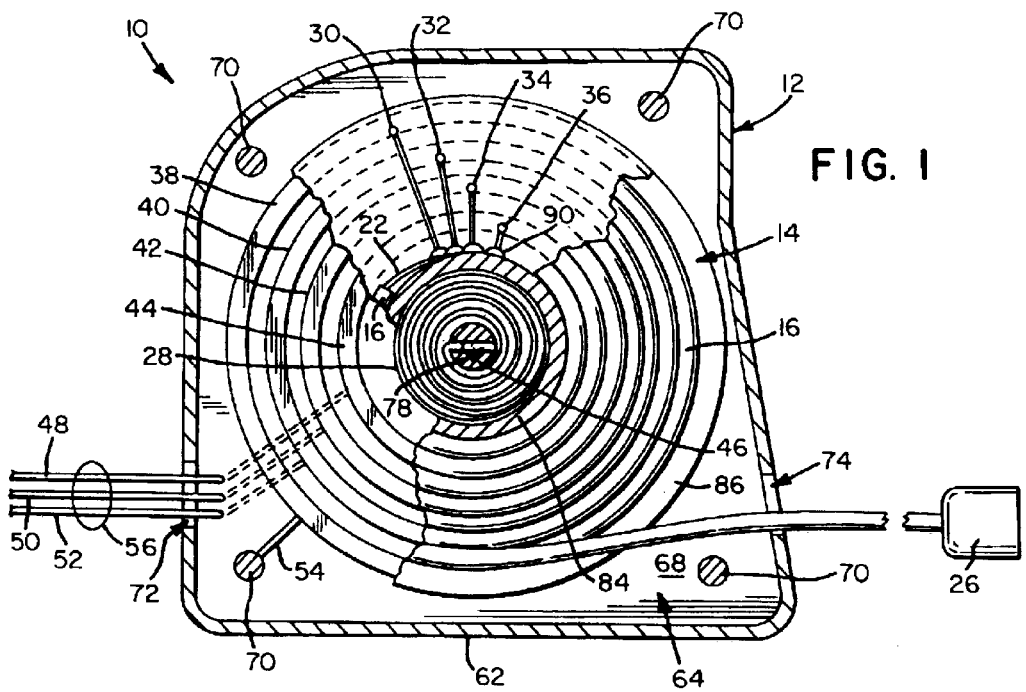
FIG. 1 is a side view of a cable retracting device in accordance with the present invention with portions broken away to reveal details thereof.
Figure 2:
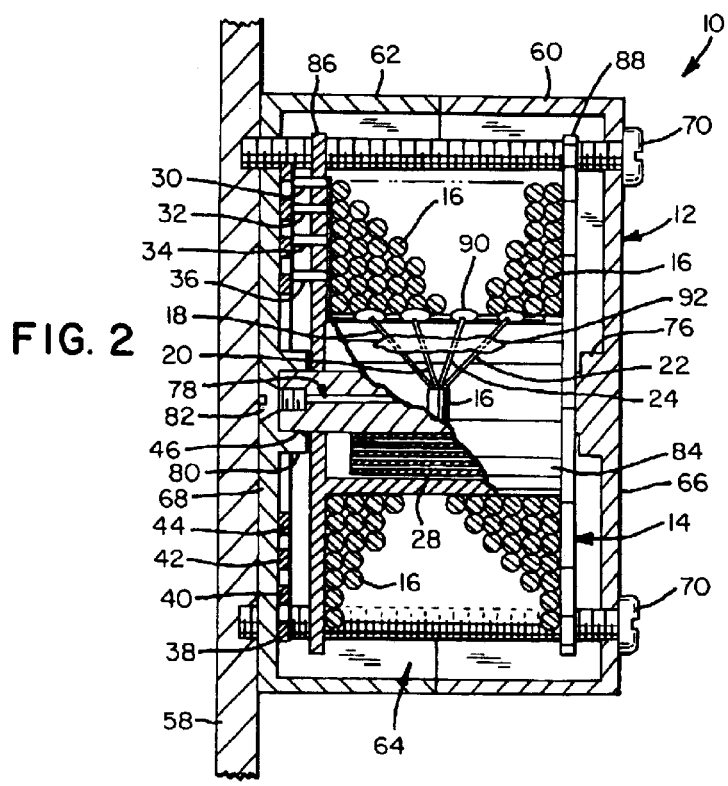
FIG. 2 is a front view of the cable retracting device of FIG. 1 with portions broken away to reveal details thereof.

Referring now to the FIGS., a cable retracting device in accordance with the present invention is shown at 10. Device 10 includes a housing 12 containing a rotatable spool 14 upon which is wound a cable 16 with a plurality of insulated, electrical leads 18, 20, 22 and 24. The outer ends of leads 18–24 are connected to a plug 26 that can be connected to the electrical system (not shown) of a towing vehicle. Plug 26 can be extended from housing 12 by the application of a light pulling force to cable 16 with a coiled spring 28 causing cable 16 to rewind on spool 14, and plug 26 to return to housing 12, when the force is released. The inner ends of leads 18–24 are respectively connected to electrical contacts 30, 32, 34 and 36 protruding from one side of spool 14. Contacts 30–36 engage and slide upon electrically conductive rings 38, 40, 42 and 44 that are concentrically arranged around the spindle 46 supporting spool 14. Rings 38–44 are respectively connected to electrical leads 48, 50, 52 and 54. Leads 48, 50 and 52 comprise a cable 56 extending from housing 12 to connect with the electrical system (not shown) of a trailer and lead 54 is connected to a grounded portion 58 of the trailer. Thus, device 10 connects two electrical systems together while minimizing the length of loose cable 16 required to accomplish the task.

Housing 12 includes a right part 60 and a left part 62 held together in clamshell-like fashion to define an interior space 64 between their side walls 66 and 68. Threaded fasteners 70 that pass through both parts 60 and 62 and penetrate the grounded side wall 58 join parts 60 and 62. Joined together, parts 60 and 62 provide a weather-resistant cover for spool 14 and its burden. Cable access to spool 14, is provided through small openings 72 and 74 located at the front and back of housing 12.

Left part 62 of housing 12 carries rings 38–44, each of which is connected to a respective one of electrical leads 48–54. Outermost ring 38 is connected by lead 54 to an electrically conductive screw 70 penetrating a grounded portion of trailer at 58. Inner rings 40, 42 and 44, however, have leads 48, 50 and 52 extending therefrom such that each of leads 48, 50 and 52 passes behind the exposed portion of the rings 40, 42 and 44 to which they are not connected. Thus, leads 48–54 do not, at any time, interfere with the engagement of contacts 30–36 with rings 38–44.

Spindle 46 is integrally formed with right part 60 and extends to the center of rings 38–44. The base 76 of spindle 46 is widened to provide a shoulder that spaces the periphery of spool 14 from side wall 66 and prevents binding between spool 12 and right part 60. The free end of spindle 12, on the other hand, is split or bifurcated to provide a slot 78 for receiving the inner end of coiled spring 28.

Left part 62 of housing 12 is substantially a mirror image of right part, but carries rings 38–44 and leads 48–54. Left part 62 is provided with a tubular sleeve 80 into which the free end of spindle 46 is nested. The top of sleeve 80 serves as a shoulder to space the periphery of spool 14 away from side wall 68 to prevent the binding of spool 14 on left part 62. A threaded fastener 82 penetrates side wall 68 to grip the free end of spindle 46.

Spool 14 includes a hollow, cylindrical drum 84 formed from an electrical insulator and supporting at its opposite ends a pair of shoulder disks 86 and 88 each having a diameter greater than that of drum 84. Positioned between, and secured at its opposite ends to, drum 84 and spindle 46 is coiled spring 28. Secured to disk 86 outside drum 84 are contacts 30–36. Through conventional soldiering techniques, leads 18–24 are connected at soldering points 90 to contacts 30–36. After soldiering, leads 18–24 are further anchored to drum 84 by means of a dab of adhesive 92 or a mechanical fastener (not shown). The winding of leads 18–24, and cable 16, on drum 84 follows anchoring in the usual way.

The use of device 10 is straightforward. First, device 10 is mounted by threaded fasteners 70 upon trailer portion 58. Next, cable 56 and leads 50–54 are connected to the electrical system of the trailer. Then, after hitching the trailer to a towing vehicle, plug 26 is extended away from housing 12 by pulling lightly on cable 16 and plug 26 is connected to the electrical system of the towing vehicle. Now, for example, the turn signal indicator lights and brake lights on the trailer will be appropriately energized when an electrical signal is delivered from the towing vehicle through cables 16 and 56.

When cable 16 is extended from housing 12, spool 14 is caused to rotate thereby winding spring 28. Wound spring 28 maintains cable 16 under light tension so that as any slack develops therein, it is retracted into housing 12 by rewinding spool 14. Similarly, if tension is applied to cable 16 sufficient to overcome the pull of spring 28, cable 16 will be unwound from spool 14. With spring 28 being wound by the extension of cable 16 from spool 14. Regardless of distance plug 26 is pulled from housing 12, electrical connection is maintained between cables 16 and 56 by the constant engagement of contacts 30–36 with rings 38–44.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A cable retracting device, comprising:
   a housing having an interior space bounded in part by a side wall and a spindle projecting into said interior space from said side wall;
   a plurality of electrically conductive rings affixed to said side wall and concentrically arranged around said spindle;
   a plurality of first electrical leads, each of said first electrical leads being connected to a respective one of said electrically conductive rings and extending outwardly from said housing;
   a spool rotatably mounted upon said spindle;
   a plurality of electrical contacts protruding from one side of said spool, each of said contacts slidably engaging a respective one of said electrically conductive rings;
   a plurality of second electrical leads being wound about said spool, each of said second electrical leads also being connected at one end thereof to a respective one of said electrical contacts, and each of said second electrical leads having another end extending from said housing and that can be selectively pulled from said spool; and,
   a coiled spring connected to said spool for rewinding said second electrical leads thereon in the event that said second electrical leads become unwound.

2. A cable retracting device, comprising:
   a housing formed of an electrically insulative material and having an interior space bounded in part by a side wall as well as a spindle projecting into said interior space from said side wall;
   a plurality of electrically conductive rings being affixed to said side wall and being concentrically arranged around said spindle;
   a plurality of first electrical leads, each of said first electrical leads being connected to a respective one of said electrically conductive rings and extending outwardly from said housing;
   a spool rotatably mounted upon said spindle, said spool including:
     a hollow, cylindrical drum; and,
     a pair of shoulder disks being secured to the opposite ends of said drum, each of said shoulder disks having a diameter greater than that of said drum;
   a plurality of electrical contacts mounted upon said spool, each of said contacts slidably engaging a respective one of said electrically conductive rings, each of said contacts including:
     an electrically conductive button protruding from one of said shoulder disks and slidably engaging a respective one of said electrically conductive rings; and,
   an electrically conductive, terminal end extending from said button and terminating at a soldier point on said drum;
   a plurality of second electrical leads being wound about said drum, each of said second electrical leads also being soldiered at one end thereof to said soldiering point of a respective one of said electrical contacts, and each of said second electrical leads having another end extending from said housing and that can be selectively pulled from said spool; and,
   a coiled spring connected at its opposite ends to said spindle and said drum for rewinding said second electrical leads thereon in the event that said second electrical leads become unwound.

* * * * *